US 6,529,783 B1

(12) United States Patent
Combelles et al.

(10) Patent No.: US 6,529,783 B1
(45) Date of Patent: Mar. 4, 2003

(54) PROCESS FOR ESTIMATING A PARASITE PHASE SHIFT DURING RECEPTION OF A MULTI-CARRIER SIGNAL AND THE CORRESPONDING RECEIVER

(75) Inventors: Pierre Combelles, Rennes (FR); Bertrand Sueur, Chantepie (FR); Dominique Lacroix, Rennes (FR)

(73) Assignees: France Telecom, Paris (FR); Telediffusion de France, Paris Cedex (FR)

( * ) Notice: Subject to any disclaimer, the term of this patent is extended or adjusted under 35 U.S.C. 154(b) by 0 days.

(21) Appl. No.: 09/508,140

(22) PCT Filed: Sep. 11, 1998

(86) PCT No.: PCT/FR98/01953

§ 371 (c)(1),
(2), (4) Date: Mar. 7, 2000

(87) PCT Pub. No.: WO99/13623

PCT Pub. Date: Mar. 18, 1999

(30) Foreign Application Priority Data

Sep. 11, 1997 (FR) .............................................. 97 11526

(51) Int. Cl.⁷ .............................................. G05B 13/02
(52) U.S. Cl. .............................. 700/39; 700/13; 700/14; 700/26; 700/27; 700/39; 700/52; 375/150; 375/226; 375/343; 375/344; 375/362; 375/367; 329/302; 329/304; 329/300; 370/479
(58) Field of Search ........................ 700/13, 14, 26–31, 700/39, 52–53; 375/150, 226–232, 261–262, 325–329, 343, 344, 315, 334–340, 362–367, 371–376; 329/302, 304, 300; 370/479

(56) References Cited

U.S. PATENT DOCUMENTS

| | | | | |
|---|---|---|---|---|
| 5,854,815 A | * | 12/1998 | Lennen | 375/343 |
| 5,933,454 A | * | 8/1999 | Cioffi | 370/480 |
| 5,966,644 A | * | 10/1999 | Suzuki | 375/219 |
| 6,282,167 B1 | * | 8/2001 | Michon et al. | 370/203 |
| 6,292,493 B1 | * | 9/2001 | Campbell et al. | 370/445 |
| 6,307,849 B1 | * | 10/2001 | Tiedemann, Jr. | 370/332 |

FOREIGN PATENT DOCUMENTS

| | | |
|---|---|---|
| EP | 631 406 | 12/1994 |
| EP | 762 702 | 3/1997 |
| EP | 785 645 | 7/1997 |
| FR | 94 07984 | 6/1994 |
| FR | 95 10067 | 8/1995 |
| FR | 95 10068 | 8/1995 |
| WO | WO 95/20848 | 8/1995 |
| WO | WO 96/00472 | 1/1996 |

* cited by examiner

Primary Examiner—Ramesh Patel
(74) Attorney, Agent, or Firm—Merchant & Gould P.C.

(57) ABSTRACT

A method for estimating an interference phase shift when receiving a multicarrier signal formed of a time series of symbols modulating a plurality of carrier frequencies, at least some of the carrier frequencies of at least some of the symbols bearing reference elements, whereof the value at transmission level is known by the receiver carrying out the reception. The phase variation $\delta_n$ between at least two symbols bearing reference elements is estimated by analysing the reference elements. Each of the reference elements in the estimation is weighted by information representing the noise affecting the carrier frequency bearing the reference element.

9 Claims, 1 Drawing Sheet

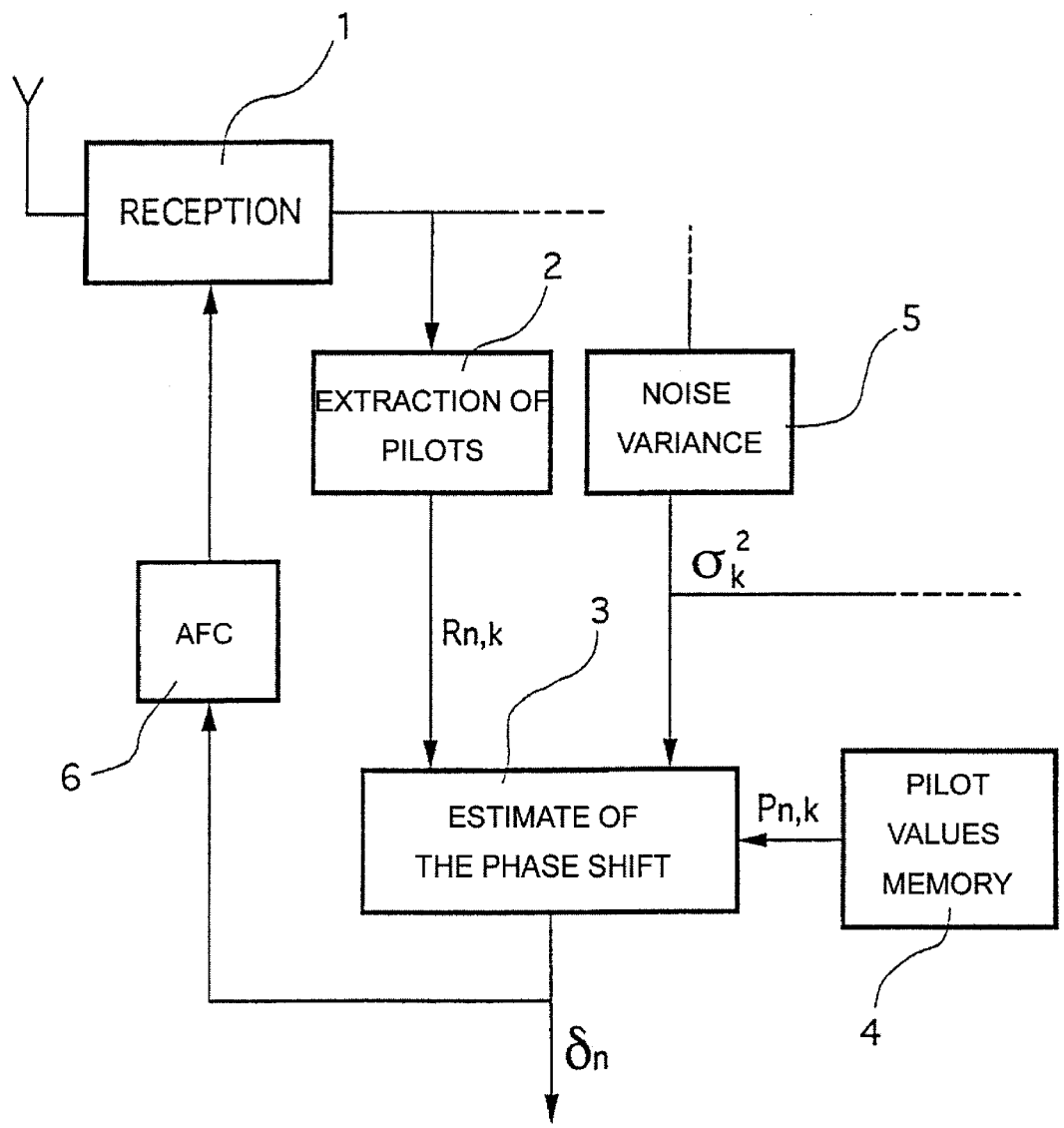

PROCESS FOR ESTIMATING A PARASITE PHASE SHIFT DURING RECEPTION OF A MULTI-CARRIER SIGNAL AND THE CORRESPONDING RECEIVER

The field of the invention relates to the reception of multi-carrier signals. More precisely, the invention relates to estimating the phase shift introduced by demodulation operations.

The invention is applicable to all types of signals using several carrier frequencies, in other words systems using signals transmitted using the Frequency Division Multiplex (FDM) technique, for example the Coded Orthogonal Frequency Division Multiplex (COFDM) system, used particularly within the framework of the European Eureka 147 "DAB" (Digital Audio Broadcasting) and RACE dTTb (digital Terrestrial TV broadcasting) projects.

In this type of transmission system, the source data to be transmitted are organized in symbols (composed of one or several source data) each modulating a carrier frequency chosen among several carriers, during a predetermined time interval. The signal formed by the set of modulated carriers is transmitted to one or several receivers that receive an emitted signal disturbed by the transmission channel.

In principle, demodulation usually consists of estimating the response of the transmission channel for each carrier and for each symbol, and then dividing the received signal by this estimate to obtain an estimate of the emitted symbol.

A number of demodulation techniques are known. The demodulation may be differential or coherent. For example, patent FR-94 07984 deposited by the same applicants describes one technique facilitating coherent demodulation using reference symbols (or "pilots") known in receivers and inserted regularly among the useful symbols.

Therefore, the multi-carrier digital signal considered includes a number of "pilots", in other words carriers modulated by known values of the receiver. Let C be the set of indices of these carriers. If K belongs to C, the complex value modulating carrier number k for the duration of symbol number n is denoted $P_{n,k}$. Note that this value is known to the receiver.

In reception, the value observed on the $n^{th}$ symbol of carrier number k is denoted $R_{n,k}$. Typically:

$$R_{n,k} = P_{n,k} H_{n,k} e^{j\phi_n} (+\text{noise}) \qquad (1)$$

where $H_{n,k}$ is the complex frequency response of the channel at the frequency of carrier number k;

$\phi_n$ is a phase introduced by the demodulation that is to be estimated ($\phi_n$ is common to all carriers).

$H_{n,k}$ varies slowly with time ($H_{n,k}$ is not very different from $H_{n+1,k}$), whereas $\phi_n$ can vary considerably from one symbol to the next if the local oscillator in the receiver is badly adjusted. Therefore, estimating $\phi_n$ is useful to determine the frequency error of the local oscillator so that it can be corrected afterwards (Automatic Frequency Control AFC).

Furthermore, as described in the documents in French patents FR-95 10067 and FR-95 10068 deposited by the applicants who also deposited this patent application, knowledge of $\phi_n$ is useful to reduce the bias introduced by white frequency distortion, and take account of an estimate of this type of white distortion for demodulation.

In practice, only the variations of $\phi_n$ need to be estimated: the value of $\phi_o$ fixed by definition may be incorporated into the response of channel $H_{n,k}$. Since $H_{n,k}$ is not very different from $H_{n+1,k}$, $(\phi_n - \phi_{n-1})$, denoted $\delta_n$, is conventionally estimated from $R_{n,k}$ using the following formula:

$$\delta_n = \text{Arg}\left\{\sum_{k \in C}\left[(R_{n,k} \cdot P^*_{n,k})(R_{n-1,k} \cdot P^*_{n-1,k})^*\right]\right\} \qquad (2)$$

This known approach is explained as follows. The modulus of the square of $H_{n,k}$ will be denoted $A_{n,k}$, and the modulus of the square of $P_{n,k}$ will be denoted $Q_{n,k}$. According to equation (1), $R_{n-1,k} P^*_{n,k}$ gives an estimate of $Q_{n,k} H_{n,k} e^{j\phi_{n-1}}$. Similarly, $R_{n,k} P^*_{n-1,k}$ gives an estimate of $Q_{n-1,k} H_{n-1,k} e^{j\phi_{n-1}}$. Finally, since $H_{n,k}$ is not very different from $H_{n-1,k}$, $H_{n,k} H^*_{n-1,k}$ is close to $A_{n,k}$. Therefore $$\delta_n = \text{Arg}\left\{\sum_{k \in C}\left[Q_{n,k} Q_{n-1,k} A_{n,k} e^{j(\phi_n - \phi_{n-1})}\right]\right\}$$

It is useful to weight the terms in the sum by $Q_{n,k} \cdot Q_{n-1,k} \cdot A_{n,k}$ since it reflects the reliability of each term (the phase is more reliable for larger magnitudes). Therefore, this type of estimate is particularly suitable for channels with selective frequency, for which $A_{n,k}$ varies strongly with k.

Finally, the phase $\delta_n$ of the sum gives an estimate of $(\phi_n - \phi_{n-1})$ for which the reliability increases with the number of carriers of C.

In practice, values of $P_{n,k}$ usually have the same modulus Q. $P_{n,k}$ may be completely independent of n (continuous carriers); in this case, the sum (2) may be simplified since $P^*_{n,k} P_{n-1,k}$ is always equal to Q, as follows:

$$\delta_n = \text{Arg}\left\{\sum_{k \in C}\left[R_{n,k} \cdot R_{n-1,k} \cdot P^*_{n-1,k}\right]\right\} \qquad (2a)$$

In the following, the form of equation (2) will be maintained in order to remain general, but the form (2a) is obviously preferable in the case of continuous carriers.

In some cases, an attempt is made to estimate $(\phi_n - \phi_{n-t})$, where t>1, rather than $(\phi_n - \phi_{n-1})$; obviously, the method remains the same. All that is necessary is to replace subscript n−1 by n−t.

The inventors have observed that although this conventional technique may be efficient under transmission conditions in which there is not much interference, it is poor in some conditions in the presence of interference sources. In this case, some carriers are continuously polluted by very strong noise, sometimes much stronger than the useful signal. The result of this is some completely distorted terms, usually with a strong amplitude, in sum (2). Since $\delta_n$ is fairly small, particularly when the local oscillator tends towards the right frequency), these few terms can completely disturb the result of the sum.

One particular purpose of this invention is to overcome this disadvantage with the state-of-the-art.

More precisely, one purpose of the invention is to provide a technique for strongly attenuating the effect of interference sources on the estimate of the phase shift induced by the receiver.

In other words, the purpose of the invention is to provide a process and a corresponding receiver that optimizes the estimate of the phase shift, particularly when the phase shift is small.

Another purpose of the invention is to supply a corresponding technique that is simple to use and that does not require complex calculations or specific means in the receivers.

Another purpose of the invention is to provide a similar technique that does not require any modification to the signal to be emitted, and which is therefore compatible with transmission techniques already used.

These purposes, and others that will become clear in the following description, are achieved according to the invention using a process for estimating a parasite phase shift on reception of a multi-carrier signal formed by a time sequence of symbols modulating a plurality of carrier frequencies, at least some of the said carrier frequencies for at least some of the said symbols carrying reference elements, for which the values on transmission are known to the receiver that receives them, this process being of the type comprising a step in which the phase variation $\delta_n$ between at least two symbols carrying the reference elements is estimated, in which the contribution of at least some of the said reference elements in the said estimate is weighted by information representative of the noise affecting the carrier frequency carrying the said reference element.

Thus, the importance assigned to each pilot depends on the disturbances that affect it, and therefore its credibility. It should be noted that this new approach is not obvious, but is based particularly on the formulation of the problem described above, that has never been made or envisaged before.

Note that in general, the phase shift is induced particularly (but not exclusively) by the receiver.

The said information representative of the noise may in particular belong to the group comprising:

- the variance of the noise affecting each carrier frequency ($\sigma^2_k$);
- the amplitude of the product $R_{n,k} \cdot R^*_{n-i,k}$;
- the error rate affecting each carrier frequency;
- information indicating that the carrier is not reliable.

This information, and particularly the noise variance, has often already been calculated for other applications, particularly the calculation of the signal to noise (S/N) ratio on each carrier to optimize Viterbi decoding with weighted inputs ("soft decoding").

Therefore, very few calculations need to be carried out. All that is necessary is to weight normal calculations as a function of available information.

Thus, when estimating the variance, the estimate of the phase variation $\delta_n$ is advantageously calculated as follows:

$$\delta_n = \text{Arg}\left\{\sum_{k \in C}\left[\frac{1}{\sigma^2_k}(R_{n,k} \cdot P^*_{n,k})(R_{n-1,k} \cdot P^*_{n-1,k})^*\right]\right\} \quad (3)$$

where $P_{n,k}$ is the value of the reference element as it was emitted;

$R_{n,k}$ is the value of the reference element as it was received;

n is the time dimension;

k is the frequency dimension;

C is the set of carrier frequencies carrying reference elements.

When the receiver calculates an estimate of $\rho n,k = A_{n,k}/\sigma^2_k$, where $\sigma^2_k$ is an estimate of the noise variance and $A_{n,k}$ is an estimate of the modulus of the square of the frequency response of the channel on carrier frequency k at instant n, the estimate of the phase variation $\delta_n$ may for example be calculated as follows:

$$\delta_n = \text{Arg}\left\{\sum_{k \in C}\left[\rho_{n,k}(R_{n,k} \cdot P^*_{n,k})(R_{n-1,k} \cdot P^*_{n-1,k})^*\right]\right\} \quad (4)$$

According to one advantageous embodiment of the invention, the said weighting consists simply of thresholding, and only reference elements carried by carrier frequencies for which the said information representative of the noise exceeds a predetermined threshold are taken into account.

It is verified that this solution, which is shorter but simpler, is sufficient in most cases.

In this case, if the said information representative of the noise is an estimate of the noise variance, the estimate of the phase variation $\delta_n$ may be calculated as follows:

$$\delta_n = \text{Arg}\left\{\sum_{k \in C}\left[I(\sigma_k)(R_{n,k} \cdot P^*_{n,k})(R_{n-1,k} \cdot P^*_{n-1,k})^*\right]\right\} \quad (5)$$

where: $I(\sigma_k)$ is equal to 1 provided that $\sigma_k$ is below the said threshold, and is otherwise equal to 0.

If the said information representative of the noise is an estimate of $\rho_{n,k} = A_{n,k}/\sigma^2_k$, the estimate of the phase variation $\delta_n$ is advantageously calculated as follows:

$$\delta_n = \text{Arg}\left\{\sum_{k \in C}\left[J(\rho_{n,k})(R_{n,k} \cdot P^*_{n,k})(R_{n-1,k} \cdot P^*_{n-1,k})^*\right]\right\} \quad (6)$$

where $J(\rho_{n,k})$ is equal to 1 provided that $\rho_k$ is above the said threshold, and is otherwise equal to 0.

The invention also relates to receivers embodying this type of process. These receivers comprise estimating means that weight the contribution of each of the said reference elements in the said estimate by information representative of the noise affecting the carrier frequency carrying the said reference element.

Preferably, the said information representative of the noise is an estimate of the noise variance affecting each carrier frequency ($\sigma^2_k$).

Other characteristics and advantages of the invention will become clear after reading the following description of a preferred embodiment of the invention, given as a simple illustrative and non-limitative example of the single FIGURE that diagrammatically illustrates the process according to the invention.

As mentioned in the preamble, the invention is applicable to the reception of multi-carrier signals, and more precisely concerns the estimate of a phase shift induced mainly (but not exclusively) by the receiver.

For example, the process according to the invention may be used to optimize the precision of the phase shift used in documents in French patents FR-95 10067 and FR-95 10068 deposited by the applicants who deposited this patent.

The invention also makes it very easy to improve the estimate of the phase shift between two consecutive or non-consecutive symbols, for example to act on the automatic frequency control (AFC).

The single FIGURE illustrates the principle of the invention.

The signal transmitted through the transmission channel is conventionally received by reception means 1 that perform conventional operations in order to find the different transmitted carriers (amplification, filtering, FFT, etc.). Still conventionally, the received pilots $R_{n,k}$ are extracted (2) from the received signal.

These values $R_{n,k}$ are input to the calculation module 3 to estimate the phase shift, which also receives known values $P_{r,k}$ of the pilots from an internal memory 4.

Furthermore, according to the invention, the estimating module 3 receives the calculation of the variance $\sigma^2_k$ from noise variance calculation means 5, and this variance will also be used by other conventional applications. Several conventional techniques are known for calculating $\sigma^2_k$.

In one variant of the invention, the variance $\sigma^2_k$ is replaced by the value $\rho_{n,k}=A_{n,k}/\sigma^2_k$. Other alternative or additional information representative of interference sources can also be taken into account.

The estimating module 3 outputs the estimate of the phase variation $\delta_n$ that may be used for various operations, and particularly to control the AFC 6.

According to the invention, this information $\delta_n$ takes account of a weighting factor that depends on the confidence that can be assigned to each carrier, due to detected interference sources. If module 5 outputs the information $\rho^2_k$, the estimating module can then calculate:

$$\delta_n = \text{Arg}\left\{\sum_{k \in C}\left[\frac{1}{\sigma^2_k}(R_{n,k} \cdot P^*_{n,k})(R_{n-1,k} \cdot P^*_{n-1,k})^*\right]\right\} \quad (3)$$

According to a simplified version, it may be sufficient to perform a short and much simpler weighting:

$$\delta_n = \text{Arg}\left\{\sum_{k \in C}\left[I(\sigma_k)(R_{n,k} \cdot P^*_{n,k})(R_{n-1,k} \cdot P^*_{n-1,k})^*\right]\right\} \quad (5)$$

where $I(\sigma_k)$ is equal to 1 provided that $\sigma_k$ is below a given threshold S, and is equal to 0 when $\sigma_k$ is greater than S. In one physical embodiment, the block that estimates $\sigma_k$ outputs a control signal when $\sigma_k$ exceeds S. The module 3 that calculates the sum (4) disables use of the current term when it receives this signal.

If the receiver calculates $\rho_{n,k}=A_{n,k}/\sigma^2_k$ instead of $\sigma^2_k$, the calculation becomes:

$$\delta_n = \text{Arg}\left\{\sum_{k \in C}\left[\rho_{n,k}(R_{n,k} \cdot P^*_{n,k})((R_{n-1,k} \cdot P^*_{n-1,k})^*\right]\right\} \quad (4)$$

In the simplified version, this gives:

$$\delta_n = \text{Arg}\left\{\sum_{k \in C}\left[J(\rho_{n,k})(R_{n,k} \cdot P^*_{n,k})(R_{n-1,k} \cdot P^*_{n-1,k})^*\right]\right\} \quad (6)$$

where $J(\rho_{n,k})$ is equal to 1 provided that $\rho_{n,k}$ is above a threshold S, and is equal to 0 when $\rho_{n,k}$ is less than S. In one physical embodiment, the block that estimates $\rho_{n,k}$ outputs a control signal when $\rho_{n,k}$ becomes less than S. The module 3 that calculates the sum (6) disables use of the current term when it receives this signal.

What is claimed is:

1. Process for estimating a parasite phase shift on reception of a multi-carrier signal formed by a time sequence of symbols modulating a plurality of carrier frequencies, at least some of said carrier frequencies for at least some of said symbols carrying reference elements, for which the values on transmission are known to a receiver that receives them, the process comprising a step of determining an estimate of a phase variation $\delta_n$ between at least two symbols carrying said reference elements by analysis of said reference elements, wherein a contribution of at least some of said reference elements is weighted by information representative of a noise affecting said carrier frequency carrying said reference element.

2. Process according to claim 1, wherein said information representative of said noise is a member of the group consisting of:

a variance of said noise affecting each carrier frequency ($\sigma^2_k$);

an amplitude of a product ($R_{n,k} \cdot R_{N-1,k}$);

an error rate affecting each carrier frequency;

external information indicating that a carrier is not reliable.

3. Process according to claim 1, wherein said information representative of said noise is an estimate of said noise variance, and said estimate of said phase variation $\delta_n$ is calculated as follows:

$$\delta_n = \text{Arg}\left\{\sum_{k \in C}\left[\frac{1}{\sigma^2_k}(R_{n,k} \cdot P^*_{n,k})(R_{n-1,k} \cdot P^*_{n-1,k})^*\right]\right\}$$

where $P_{n,k}$ is a value of said reference element as said reference element was emitted;

$R_{n,k}$ is a value of said reference element as said reference element was received;

n is a time dimension;

k is a frequency dimension;

C is a set of said carrier frequencies carrying said reference elements.

4. Process according to claim 2, wherein said information representative of said noise is an estimate of $\rho_{n,k}=A_{n,k}/(\sigma^2_k)$, where $\sigma^2_k$ is an estimate of said noise variance and $A_{n,k}$ is an estimate of a modulus of a square of a frequency response of a channel on carrier frequency k at instant n, and in that said estimate of said phase variation $\delta_n$ is calculated as follows:

$$\delta_n = \text{Arg}\left\{\sum_{k \in C}\left[\rho_{n,k}(R_{n,k} \cdot P^*_{n,k})(R_{n-1,k} \cdot P^*_{n-1,k})^*\right]\right\}$$

where $P_{n,k}$ is a value of said reference element as said reference element was emitted;

$R_{n,k}$ is a value of said reference element as said reference element was received;

n is a time dimension;

k is a frequency dimension;

C is a set of said carrier frequencies carrying said reference elements.

5. Process according to claim 1, wherein said weighting comprises thresholding, and only reference elements carried by carrier frequencies for which said information representative of said noise exceeds a predetermined threshold are taken into account.

6. Process according to claim 5, wherein said information representative of said noise is an estimate of said noise variance, and in that said estimate of said phase variation $\delta_n$ is calculated as follows:

$$\delta_n = \text{Arg}\left\{\sum_{k \in C}\left[I(\sigma_k)(R_{n,k} \cdot P^*_{n,k})(R_{n-1,k} \cdot P^*_{n-1,k})^*\right]\right\}$$

where: $I(\sigma_k)$ is equal to one provided that $\sigma_k$ is below said threshold, and is otherwise equal to 0;

where $P_{n,k}$ is a value of said reference element as said reference element was emitted;

$R_{n,k}$ is a value of said reference element as said reference element was received;

n is a time dimension;

k is a frequency dimension;

C is a set of said carrier frequencies carrying said reference elements.

7. Process according to claim 5, wherein said information representative of said noise is an estimate of $\rho_{n,k} = A_{n,k}/(\sigma^2_k)$, where $\sigma^2_k$ is an estimate of said noise variance and $A_{n,k}$ is an estimate of a modulus of a square of a frequency response of a channel on carrier frequency k at instant n, and in that said estimate of said phase variation $\delta_n$ is calculated as follows:

$$\delta_n = \text{Arg}\left\{\sum_{k \in C}\left[J(\rho_{n,k})(R_{n,k} \cdot P^*_{n,k})(R_{n-1,k} \cdot P^*_{n-1,k})^*\right]\right\}$$

where: $J(\rho_{n,k})$ is equal to one provided that $\rho_{n,k}$ is below said threshold, and is otherwise equal to 0;

where $P_{n,k}$ is a value of said reference element as said reference element was emitted;

$R_{n,k}$ is a value of said reference element as said reference element was received, n is a time dimension;

k is a frequency dimension;

C is a set of said carrier frequencies carrying said reference elements.

8. Receiver of a multi-carrier signal formed by a time sequence of signals modulating a plurality of carrier frequencies, at least some of said carrier frequencies for at least some of said symbols carrying reference elements, for which values on transmission are known to a receiver, comprising means for estimating a phase variation $\delta_n$ between at least two symbols carrying reference elements, by analysis of said reference elements, wherein said estimating means weight a contribution of each of said reference elements in said estimate by information representative of a noise affecting a carrier frequency carrying said reference element.

9. Receiver according to claim 8, wherein said information representative of said noise is an estimate of a noise variance affecting each carrier frequency ($\sigma^2_k$).

\* \* \* \* \*